United States Patent [19]

Flinois et al.

[11] Patent Number: 5,054,097

[45] Date of Patent: Oct. 1, 1991

[54] METHODS AND APPARATUS FOR ALIGNMENT OF IMAGES

[75] Inventors: Xavier A. Flinois, Mountain View; Stefano E. Concina, San Jose, both of Calif.

[73] Assignee: Schlumberger Technologies, Inc., San Jose, Calif.

[21] Appl. No.: 276,359

[22] Filed: Nov. 23, 1988

[51] Int. Cl.$^5$ .............................................. G06K 9/36
[52] U.S. Cl. ........................................ 382/44; 382/42; 382/45; 358/139; 364/723; 364/728.03
[58] Field of Search ................... 382/47, 48, 45, 44, 27, 382/42, 23; 356/23, 24, 25; 364/728.01, 728.03, 723; 358/428, 139

[56] References Cited

U.S. PATENT DOCUMENTS

| 4,610,026 | 9/1986 | Tabata et al. | 382/47 |
| 4,644,582 | 2/1987 | Morisuita et al. | 382/48 |
| 4,706,019 | 11/1987 | Richardson | 324/158 R |
| 4,721,909 | 1/1988 | Richardson | 324/158 R |
| 4,805,123 | 2/1989 | Specht et al. | 382/48 |

OTHER PUBLICATIONS

E. Menzel & E. Kubalek, Fundamentals of Electron Beam Testing of Integrated Circuits, 5 Scanning 103-122 (1983).
E. Plies & J. Otto, Voltage Measurement Inside Integrated Circuit Using Mechanical and Electron Probes, IV Scanning Electron Microscopy 1491-1500 (1985).
S. Concina, G. Liu, L. Lattanzi, S. Reyfman & N. Richardson, Software Integration in a Workstation Based E-Beam Tester, International Test Conference Proceedings (1986).
N. Richardson, E-Beam Probing for VLSI Circuit Debug, VLSI Systems Design (1987).
S. Concina & N. Richardson IDS 5000: an Integrated Diagnosis System for VLSI, 7 Microelectronic Engineering (1987).
T. May, G. Scott, E. Meieran, P. Wiener & V. Rao, Dynamic Fault Imaging of VLSI Random Logic Devices, International Physics Symposium Proceedings (1984).
W. Pratt, Digital Image Processing (1978), pp. 113-116.
H. Feuerbaum, Electron Beam Testing: Methods and Applications, 5 Scanning 14-24 (1983).
S. Daniel & L. Hampton, Diagnosing Yield Problems with E-Beam Probers, Semiconductor International (Aug., 1988).
S. Harari & C. Talbot, Chip Diagnosis: A New Methodology, Evaluation Engineering (Oct., 1987).
J. McLeod, A New Tool Dramatically Cuts VLSI Debugging Time, Electronics (Apr. 30, 1987).
Solving the Navigational Problem in VLSI Debug, 1 Issues in VLSI Diagnostics & Test, No. 2 (published by Schlumberger/ATE, Oct., 1987).
IDS 4000 Integrated Diagnostic System, (published by Schlumberger/ATE, Aug., 1988).
IDS 5000 Integrated Diagnostic System, (published by Schlumberger/ATE, May, 1988).

Primary Examiner—Michael Razavi
Assistant Examiner—Yon Jung
Attorney, Agent, or Firm—Kenneth Olsen; Keith G. W. Smith; Bruce D. Riter

[57] ABSTRACT

Methods and apparatus are disclosed for rapid and interactive "warping" of a first image made up of pixels to form a resulting image made up of pixels which are aligned, pixel-for-pixel, with a second image made up of pixels. The images may be stroboscopic voltage contrast images representing operating states of two integrated circuit devices—a failing device and a fully functional device. The aligned images permit an engineer who may have little knowledge of the device to diagnose dynamic failures of the failing device by comparing the aligned images to produce an image showing the differences.

24 Claims, 8 Drawing Sheets

METHODS AND APPARATUS FOR ALIGNMENT OF IMAGES

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The present invention relates to methods and apparatus for alignment of high-resolution pixel images, and more particularly to methods and apparatus for aligning stroboscopic voltage contrast images of operating states of integrated circuit devices. The aligned images are useful in analyzing dynamic failures of integrated circuits, for example.

2. Description of Related Art

Decreases in the size of internal features of Very Large Scale Integrated (VLSI) circuit devices demand ever faster and more reliable design and testing. Conventional Integrated Circuit (IC) testers can only retrieve information from the external pins of the Device Under Test (DUT), thus limiting subsequent diagnoses. A failure detected with a conventional tester may be caused by a discrepancy at any point inside the component. If the DUT has hundreds of thousands of gates, fault identification becomes a complex and tedious chore.

In a typical test operation, a conventional IC tester (one which applies stimuli to input pins of the IC and measures the results at the IC output pins) detects a fault at some vector (for example, vector v) in a test vector sequence when testing an IC device. The test sequence may contain a large number of test vectors, for example, 100 or more test vectors, each vector representing a set of stimuli, such as input voltages, applied to the pins of the DUT. The origin of the detected fault occurs somewhere in the chip, at some vector (for example, vector a), between the first vector of the sequence (vector 1) and the vector at which the fault was detected (vector v). This fault then propagates forward and appears at an external pin or bond pad of the DUT at vectro v. It is then desired to identify the nature, location and time of generation of the fault occurring at vector a.

Internal probing of the chip is therefore necessary. For many years, the preferred solution has been to probe the chip using a low energy (around 1 keV) scanning electron microscope (SEM). See, for example, E. Menzel & E. Kubalek, *Fundamentals of Electron Beam Testing of Integrated Circuits*, 5 SCANNING 103–122 (1983), and E. Plies & J. Otto, *Voltage Measurement Inside Integrated Circuit Using Mechanical and Electron Probes*, IV SCANNING ELECTRON MICROSCOPY 1491–1500 (1985).

Until recently, the SEM was a sophisticated lab instrument, used only by experienced researchers. In 1987, the "IDS 5000 ™" workstation-based, electron-beam test system was commercially introduced by Schlumberger. S. Concina, G. Liu, L. Lattanzi, S. Reyfman & N. Richardson, *Software Integration in a Workstation Based E-Beam Tester*, INTERNATIONAL TEST CONFERENCE PROCEEDINGS (1986); N. Richardson, *E-Beam Probing for VLSI Circuit Debug*, VLSI SYSTEMS DESIGN (1987); S. Concina & N. Richardson *IDS 5000: an Integrated Diagnosis System for VLSI*, 7 MICROELECTRONIC ENGINEERING (1987). See also U.S. Pat. Nos. 4,706,019 and 4,721,909 to N. Richardson.

Measurement and information gathering is thus no longer a major problem in analyzing IC failures. Organizing the extensive and detailed information obtained about an IC with such a tester is, however, critical to rapid and effective fault diagnosis.

Rather than seeking the answer to an absolute problem ("Why does this device fail?"), it may be preferable to address a relative problem ("Where, when and why does this device behave differently from a known good device?"). With the latter approach to diagnosis, operating faults in the IC can be traced.

To perform such a diagnosis, a time period of interest between 0 (the beginning of the test sequence of interest) and the first fault detection is selected. This period is divided into intervals such that, in each interval, the IC has a fixed behavior. Each interval thus corresponds to an operating state of the IC. After the states of interest have been identified, a comparison can be made between a known "good" IC device and the DUT, at each state.

Such comparisons can be made with stroboscopic voltage contrast images. The device under test (DUT) is stimulated with a sequence of test "vectors" in a conventional E-Beam test system such as the Schlumberger "IDS 5000." Each test "vector" represents a specified set of stimuli, such as input voltages applied to the pins of the IC. During the application of each vector of the sequence, the DUT is in a state for a period of time called a "strobe window." By pulsing the electron beam repeatedly in a certain phase to the beginning of the sequence, a stroboscopic image representing the state of the DUT in any desired strobe window can be obtained. This strobe process is analogous to that of using a stroboscopic light to "freeze" the operation of an automobile engine to adjust ignition timing. A series of state images makes up a stack.

The process is repeated using a known good IC device (also called a golden die), so as to acquire a stack of stroboscopic images representing its states in response to the same series of test vectors. Each of the images may, for example, be a graphical representation in digital format in the form of a $512 \times 512$ matrix of pixels of varying intensity, the intensities being represented by a value between 0 and 255 (an 8-bit value). The images thus acquired, representing operating states of the DUT, can be stored and used to diagnose operating faults in the DUT.

After the images have been acquired, the stacks may be compared. The comparison may take the form of substracting an image of the golden die from an image of the DUT (or vice versa), pixel by pixel, where the compared images are those produced in response to the same set of stimuli. The comparison is repeated, image by image, so as to produce a stack of "difference" images.

Alternatively, the two stacks may represent states of a single DUT in response to two different sets of stimuli. For example, a DUT may operate as designed at a given temperature or with a given input voltage, but fail at higher temperature or input voltage. One stack of images may be acquired representing correct operation of the DUT under one set of circumstances and a second stack acquired representing failed operation under a second set of circumstances. These stacks may also be compared, image by image, to produce a stack of "difference" images.

If the good and faulty devices behave the same way, the images are the same. Likewise, if a device subjected to different sets of stimuli is operating the same way in response to the different sets of stimuli, the images are the same. Any divergence between the two sets of images may be considered as a discrepancy in the test (or failing) device. T. May, G. Scott, E. Meieran, P. Wiener & V. Rao, *Dynamic Fault Imaging of VLSI Random Logic Devices*, INTERNATIONAL PHYSICS SYMPOSIUM PROCEEDINGS (1984). On a one-image-per-state basis, the comparison process reveals the propagation of the fault from its origin to the place where is first detected. Such a comparison process is known as Dynamic Fault Imaging (DFI).

Of course, for the comparison to work properly, the two stacks of images must represent identical conditions: the same area of the chip, imaged at the same magnification under the same SEM operating conditions. However, it is possible that the images of one stack are translated or rotated with respect to those of another stack due to slightly different orientation of the chips with respect to the SEM when the images are acquired. Perfect alignment is not always possible.

Therefore a spatial "warping" operation may need to be performed on each image of one stack to align it with a corresponding image of the other stack. The warping operation must result in precise alignment because the comparison (difference) of two images is made pixel by pixel. Any misalignment would appear in the resulting (differenced) image. A warping procedure offering such precision could take an unacceptably long time (tens of seconds) for use in rapid, interactive DFI diagnosis if there is no dedicated hardware to perform the warping operation.

Once the images have been acquired, filtered, aligned and compared pixel-by-pixel to create a stack of resulting "difference" images, the difference images may be displayed to permit tracking of fault propagation through the series of images. The "difference" images may also be processed to enhance only the important information (the fault propagation) for analysis.

To perform the DFI process efficiently demands rapid and precise alignment of images to be compared, so that when the images (or their differences) are displayed, propagation of a fault in the DUT can be readily traced, even by a person having little knowledge of the functionality of the device.

Some operations in a DFI session are repetitive (e.g., image acquisition and processing). For instance, once the right SEM operating conditions are found for an image acquired in a controlled manner, the same operation can be repeated in a batch process for the rest of the images in the stack. It is desirable to automate such repetitive tasks to allow the engineer to concentrate on the diagnostic work. At the same time, interactivity is desired so that the engineer may set parameters for the task and view the result without significant delay.

Prior art methods are known for aligning images. For example, a method which has heretofore been carried out in the Schlumberger "IDS 5000" system involves selection of three locations from a first image to be aligned respectively with three selected locations of a second image, calculating a geometric planar transformation in the form of a matrix of floating point values, and using the matrix values to transform positions of the first image into positions of a resultant image having pixels aligned with pixels of the second image, using floating point arithmetic operations. While the quality of the alignment is acceptable, the processing is not as rapid as desired. To achieve "interactive" operation, it is desirable to carry out any selected process, such as image alignment, and display the result within, for example, a period of not more than two seconds.

Other imaging systems are known in the art which employ convolutions to perform geometric operations, filtering and pattern recognition. Such systems sometimes use fast Fourier transform to speed up the computation of large convolutions. Floating-point arithmetic is often used since it is not known in advance how many operations will be performed on the data.

Another way to speed up image processing is to employ dedicated hardware processors designed to perform specific tasks at high speed. The cost of such processors can, however, add significantly to the cost of a test system. It is preferred instead to use the general-purpose processor of a standard engineering workstation to perform image processing, if this can be done without much loss of processing time.

A principal aim of the present invention is to provide a method of carrying out the alignment of stroboscopic voltage contrast images in a workstation of the type provided in a system such as the Schlumberger "IDS 5000" with sufficient speed to permit Dynamic Fault Imaging with an interactive "feel," but without the need for dedicated hardware to perform the processing.

More broadly, it is an object of the present invention to provide methods and apparatus for aligning features of one image pixel-for-pixel with those of another image.

Yet another object of the present invention is to provide methods and apparatus for aligning stroboscopic voltage contrast images representing integrated circuit operating states, as an aid in DFI analysis of integrated circuits.

Still another object of the present invention to provide for rapid and interactive alignment of voltage contrast images in a general-purpose workstation associated with an electron-beam test system, without the need for special-purpose computing hardware to perform the alignment.

These and other objects of the present invention will become apparent from the following detailed description of the preferred embodiments and the accompanying drawings.

SUMMARY OF THE INVENTION

In accordance with one form of the invention, a resultant image is prepared from a first image, the resultant image being aligned pixel-for-pixel with a second image. Each of the images comprises a set of machine-displayable pixels and has visible features defined by the pixels when displayed. Each pixel is defined by a display coordinate position and an intensity value. The alignment may be carried out in a series of steps, as follows: (a) calculating a matrix of floating point values from which coordinate positions of the first image may be mapped into respective coordinate positions of the resultant images; (b) transforming the matrix of floating point values into respective fixed point representations; (c) using the fixed point representations to calculate with fixed point arithmetic, for each display coordinate position of the resultant image, a corresponding coordinate position of the first image; and (d) extrapolating a pixel intensity value for each display coordinate position of the resultant image, from intensity values of pixels surrounding the corresponding coordinate position of the first image, thereby producing a set of pixels defining the resulting image. The resultant image comprises a version of the first image having features aligned with features of the second image, the pixels of the resultant image being aligned with respective display coordinate positions of pixels of the second image. The first and second images may be stroboscopic voltage contrast images produced by an electron-beam test system and representative of integrated circuit operating states.

The calculation of the matrix may include displaying the first and second images on a display screen, recording coordinate positions of three selected features of the first image, recording coordinate positions of three selected features of the second image with which the selected features of the first image are to be aligned in the resultant image, and calculating the matrix from the recorded coordinate positions. The values representative of the selected locations are preferably recorded with sub-pixel precision. The matrix preferably comprises a $2 \times 2$ block of values representing factors for correction of rotation, tilt and magnification distortion between the first and second images, and a $1 \times 2$ block of values representing translation of points between the first and second images. The fixed point representations of the matrix values may be stored in a register. The corresponding coordinate positions of the first image are preferably calculated in a microprocessor device.

To extrapolate pixel intensity values, floating point values representing distances of the corresponding coordinate position to the surrounding pixels may be calculated, the distance values converted into fixed point values, and the resultant image pixel value calculated from the fixed point distance values and the surrounding pixel intensity values in a processor employing fixed point arithmetic. The extrapolation is such that the resultant image pixel value comprises an average of the surrounding pixel intensity values, the average being weighted by the distance values. In a preferred embodiment, the extrapolation involves calculating a table of fixed-point values, each value of the table representing a weighted contribution of one surrounding pixel to the resultant image pixel intensity value, and storing the table of values. Values are retrieved from the table for each surrounding pixel and combined to form the resultant image pixel intensity value. Each stored value of the table is associated with a stored index value. To retrieve a value from the table, an index value is calculated from the value of at least one surrounding pixel and from the distances of such surrounding pixel to the corresponding coordinate position. The calculated index value is matched with the stored index value to select a value to be retrieved from the table.

Preparation of the resultant image is preferably carried out with a suitably programmed general purpose processor associated with an electron beam test probe system.

DESCRIPTION OF THE PREFERRED EMBODIMENTS

Figure 1:
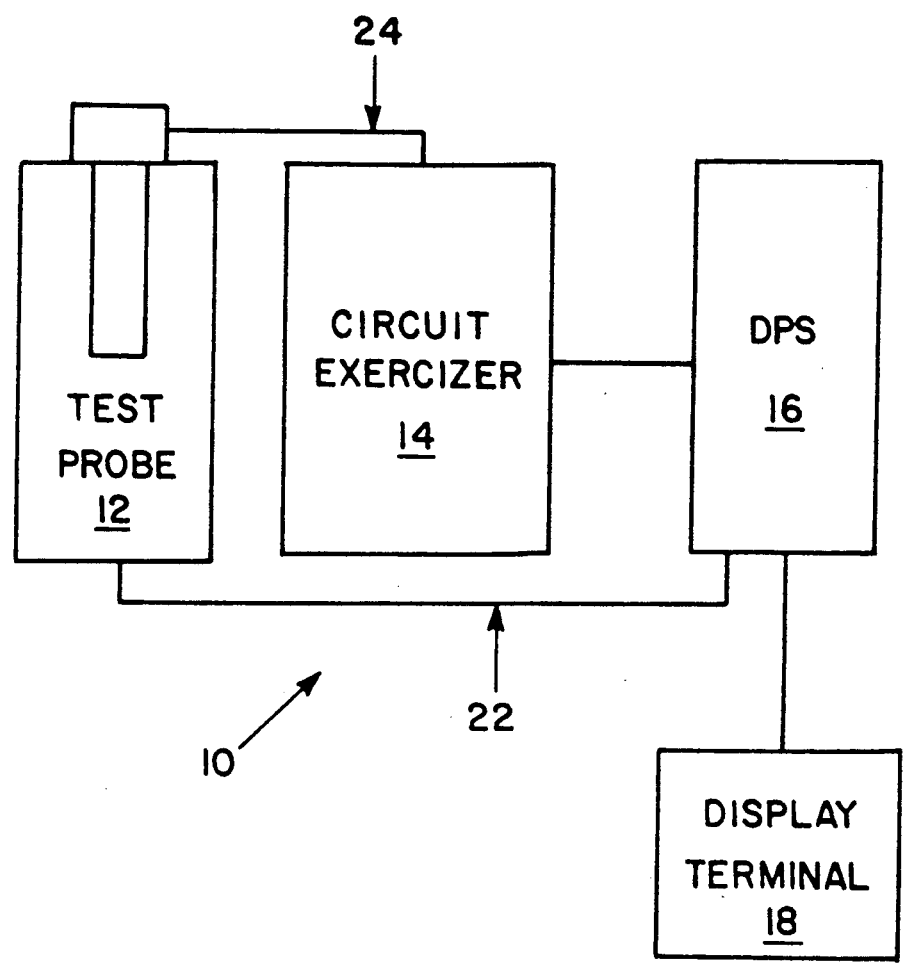
FIG. 1 is a schematic block diagram of an electron beam test system.

A schematic block diagram of an electron beam test probe system useful for analyzing integrated circuits is shown at 10 in FIG. 1. The electron beam test probe system has three functional elements: an electron beam test probe 12, a circuit exerciser 14, and a data processing system 16 which includes a display terminal 18. An integrated circuit to be analyzed is placed in the electron beam test probe 12 so that potential measurements can be made at various points of the IC. The points at which said measurements are to be made are sent to the electron beam test probe 12 by the data processing system 16 over a bus 22. During the circuit analysis, a test signal pattern is applied to the integrated circuit by the circuit exerciser 14 which is connected to the IC under test by a bus 24. The data processing system 16 may also be used to specify the test signal pattern used and the timing of the potential measurements relative to the test signal pattern. The electron beam test probe system is controlled by an operator who inputs commands through the display terminal 18.

Figure 2:
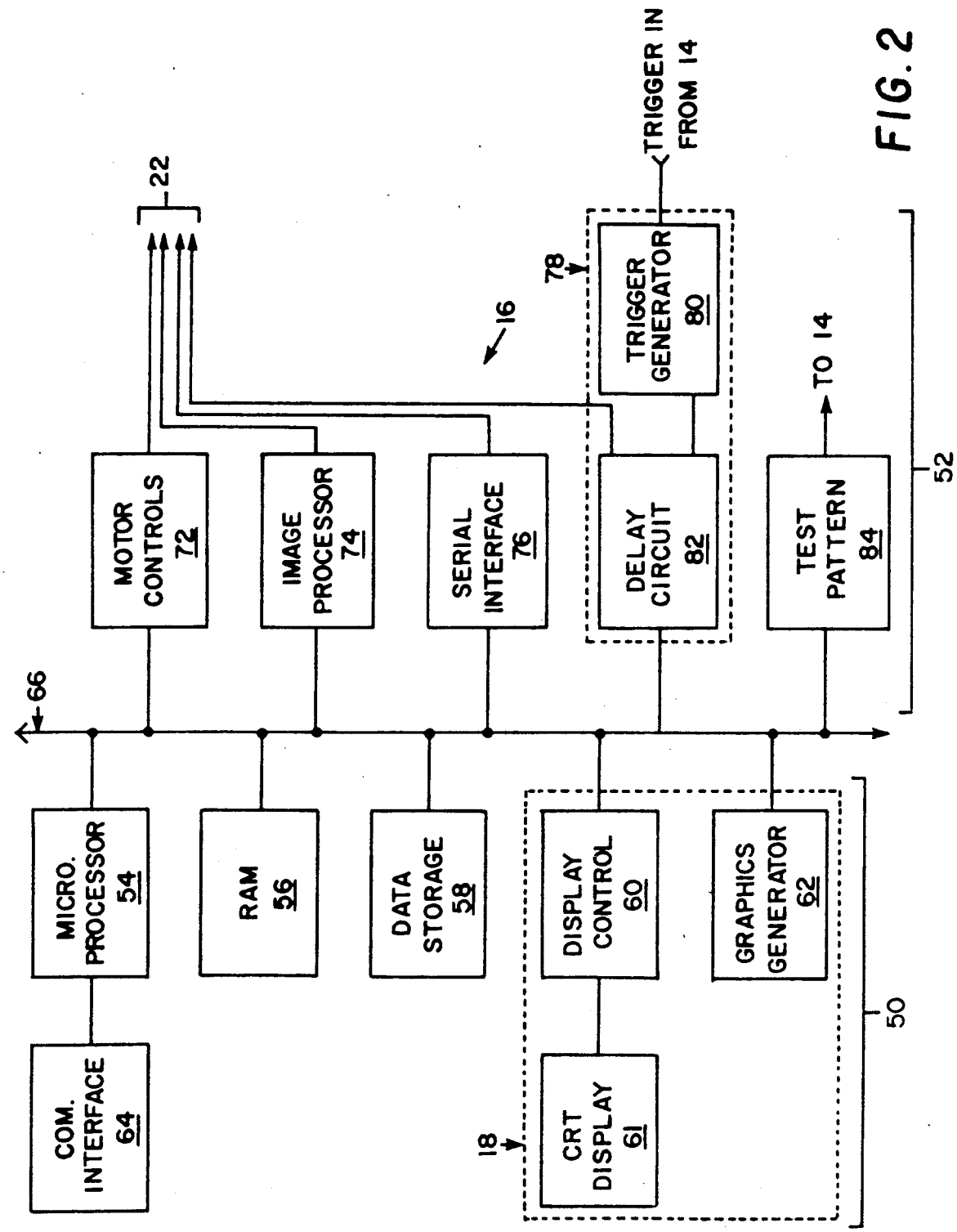
FIG. 2 is a schematic block diagram of the data processing system used in the electron beam test system illustrated in FIG. 1.

A block diagram of data processing system 16 is shown in FIG. 2. The data processing system 16 may be divided into two broad functional groups: a computing system 50 and an electron beam test probe control system 52. Only a novel aspect of the computing system 50 will be described here. The basic system is described in U.S. Pat. No. 4,706,019, the disclosure of which is incorporated herein by reference. The computing system 50 is capable of storing, processing and displaying high resolution voltage contrast images of the IC under test. Computer system 50 includes a microprocessor 54, a RAM memory 56, and a data storage module 58 which may comprise a disk drive. In addition, computer system 50 includes a display terminal 18 having a display interface 60 for driving a high resolution color display terminal 61 having a resolution of, for example, at least $1000 \times 1000$ pixels. The display terminal 18 also includes a keyboard for entering commands and a pointer means (such as a "mouse") for pointing to and specifying points on the display screen. Display terminal 18 may also include its own graphics generator 62 to improve the time needed to produce a graphic display. Computing system 50 may further include interfaces 64 for communicating with other computer systems via a communication bus 66.

Figure 3:
FIGS. 3-5 are photographs showing screen displays of stroboscopic voltage contrast images.

FIG. 3 is a photograph showing a screen display of a pair of stroboscopic voltage contrast images selected from two stacks of images acquired with a Schlumberger "IDS 5000" electron beam test probe system. Each image is made up of an array of $512 \times 512$ pixels, each pixel having a digital gray-scale intensity value between 0 and 255. Each stack may consist of up to 100 or even more of such images. It is desired to compare two such stacks, image-by-image, pixel-by-pixel, to prepare a stack of difference images which may be displayed for DFI analysis. The image displayed at the left side of FIG. 3 has visible features (for example, those marked 1, 2, 3) which appear similar to visible features (also marked 1, 2, 3) of the image displayed at the right side of FIG. 3, but the images are misaligned. The misalignment may be due to any of a number of factors: rotation, tilt or other differing physical orientation of the integrated circuits within the test probe, translation, display magnification, or the like. Also visible in the image at the right side of FIG. 3 is a circular region, labeled 20, showing a magnified portion of the image.

Figure 4:

FIG. 4 is a photograph showing a screen display of three voltage contrast images: the upper left image (in background) is the same as the upper right image of FIG. 3; the upper right image (in background) is the same as the upper left image of FIG. 3; and the lower center image (in foreground) is a "difference" image of the two images in background. Because of the misalignment, the difference image is of little diagnostic value.

Figure 5:
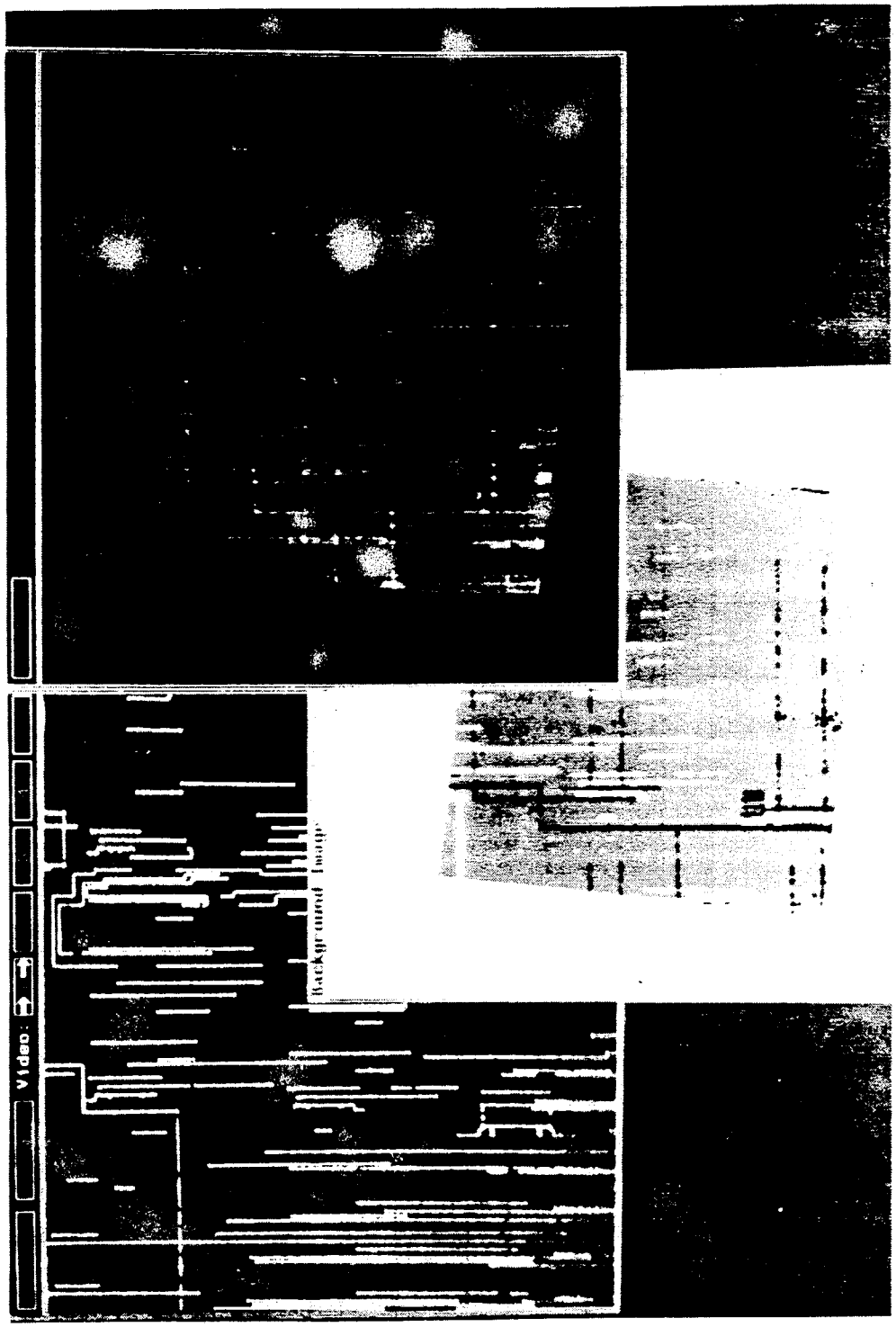

FIG. 5 is a photograph also showing a screen display of three voltage contrast images: the upper left image (in background) is the same as the upper left image of FIG. 4; the upper right image (in foreground) is a version of the upper right image of FIG. 4 which has been processed in accordance with the invention to align it with the upper left image of FIG. 5; and the lower center image (in middle ground) is a "difference" image of the upper left and upper right images of FIG. 5. The lower center image of FIG. 5 makes visible the differing voltage levels (representing differing logic levels, for example) at locations within the IC devices from which the images were acquired.

The alignment process of the present invention serves in general to "warp" one image, correcting for relative geometric distortion of the images. Hence the "warped" image represents the same area of an integrated circuit as the image with which it has been aligned.

It is to be noted that if the integrated circuit from which each stack of images is acquired is not physically moved during image acquisition, and the acquired images of the stack are processed in identical fashion, the misalignment between corresponding images of the two stacks will be the same from image to image. Therefore, an alignment process which correctly aligns an image of one stack with its counterpart from the other stack may be repeated image-by-image through the stacks to produce a stack of aligned images.

Prior art alignment methods using floating point representation have been found to process the 512×512 pixels of an image to be warped in about 80 seconds, even with a dedicated floating-point math coprocessor on the same type of workstation. The present invention offers a method of performing the warping operation employing fixed point representations, and has been found to take about 1.3 seconds, when programmed in the "C" language on a UNIX-based Sun 3/160 workstation. A listing of such a program for carrying out a preferred form of the inventive method in such a workstation is included below as an Appendix to this description. The speed of the inventive technique allows images to be aligned quickly and interactively for use in Dynamic Fault Imaging diagnosis, without requiring a dedicated coprocessor.

The principles of such alignment will now be described with reference to FIGS. 6 and 7. Correction of relative geometric distortions between corresponding images of two stacks may be made by first mapping the coordinate system (x,y) of the second image into the coordinate system (u,v) of the first image.

Figure 6:
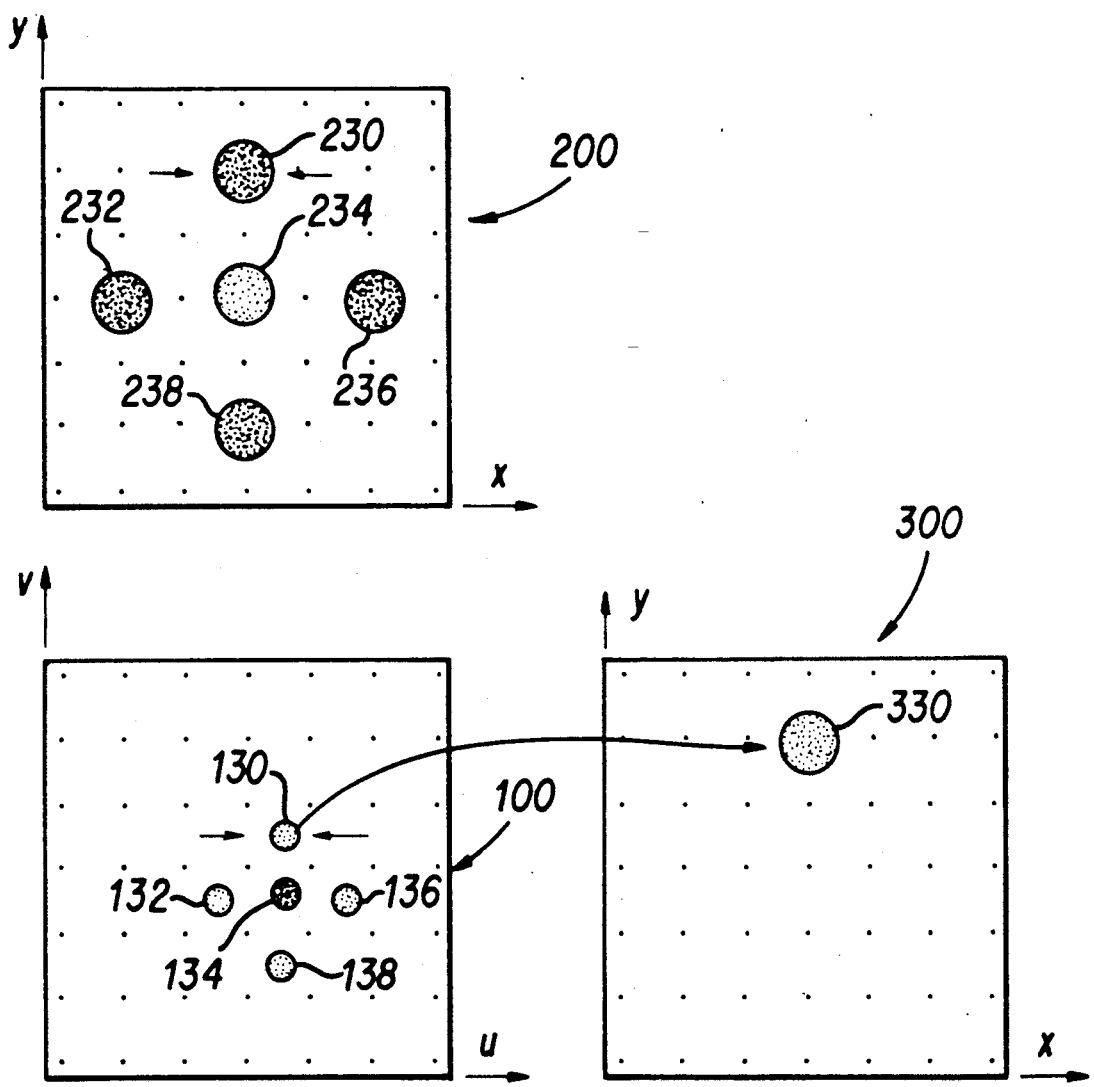
FIG. 6 illustrates schematically the steps involved in aligning images in accordance with the present invention.

FIG. 6 shows in box 100 a grouping of features 130, 132, 134, 136, 138 which define a first image. The features of box 100 are formed by pixels within the graphics frame, represented by a grid of dots positioned in their (u,v) coordinate system. Box 200 shows the positions of respective corresponding features 230, 232, 234, 236, 238 of a second image in relation to the (x,y) coordinate system of the second image. It can be seen from comparison of the size and spacing of features 130–138 of box 100 relative to features 230–238 of box 200 that the magnification of the second image is twice (2×) that of the first image, i.e., that features of the first image are spaced half as far apart as those of the second image. Comparison of boxes 100 and 200 also show that the features of box 100 are positioned slightly below and to the right of the corresponding features of box 200. In addition, since the spatial relationship of features 130, 132, 134, 136, 138 to the pixels defining them is not the same as the spatial relationship of features 230, 232, 234, 236 and 238 to the pixels defining them, it is necessary to extrapolate pixel intensity values for features 130, 132, 134, 136 and 138 at the pixel positions of the second image (box 200) in order to produce a resultant "warped" version of the first image (box 300).

Box 300 of FIG. 6 shows a feature 330 of such a resultant image, magnified and translated about 1½ increments upwardly and about ½ increment to the left, such that feature 330 is aligned with the position of feature 230 of the second image. The intensity value assigned to pixels defining feature 330 must be determined from the values of pixels from the first image, as follows.

Monotonic transfer functions to perform such mapping may be described generally as follows:
$x = X(u, v)$
$y = Y(u, v)$
where $X, Y \in C^1$ (i.e., X and Y are continuously derivable functions)

Generally speaking, X and Y graphs are not available and empiric models have to be used, such as a polynomial approximation. One possible method of performing such mapping is described in more detail below with reference to a preferred embodiment of the invention.

Because the images to be aligned are in a discrete space (images are arrays of pixels), if x or y are not integer values, the corrected display intensity value of a given pixel p(x,y) in the resultant graphics frame must then be extrapolated from the pixels surrounding the corresponding location of that pixel in the source graphics frame, using a convolution operation. In the present invention, the four surrounding pixels are employed and the convolution becomes a bilinear extrapolation. Such extrapolation techniques are known in the art: see, for example W. PRATT, DIGITAL IMAGE PROCESSING (1978), the disclosure of which is incorporated herein by reference, at page 115.

Figure 7:
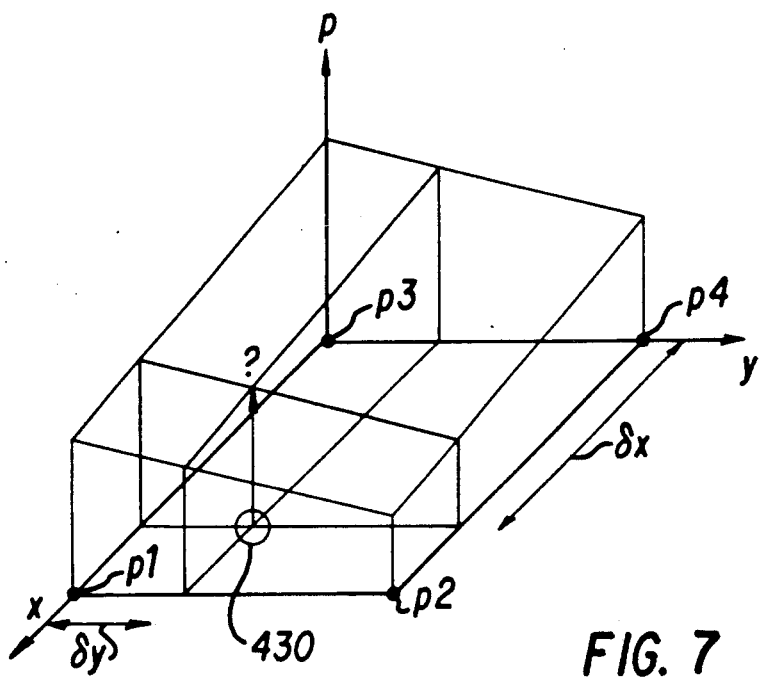
FIG. 7 illustrates schematically the extrapolation of a pixel intensity value from intensity values of surrounding pixels.

FIG. 7 shows in detail the relationship between location 430, which is the translated position of a pixel in the (x,y) coordinate system of the second image 200 to the (u,v) coordinate system of the first image 100, and pixels p1, p2, p3, p4 surrounding this translated position; the third dimension, p, of FIG. 7 represents pixel intensity.

The question mark ("?") in FIG. 7 represents the value of pixel 430 to be extrapolated.

The extrapolated value at location 430 $(x+\delta x, y+\delta y)$ with $0 \leq \delta x \leq 1$ and $0 \leq \delta y \leq 1$ is given from the expression $$p(x+\delta x, y+\delta y) = [p(x,y)\delta y + p(x,y+1)(1-\delta y)][1-\delta x] + [p(x+1,y)\delta y + p(x+1,y+1)(1-\delta y)]\delta x \quad (1)$$

where x and y each have 512 values. It will be apparent that there are many, many arithmetic operations to perform in order to construct the resultant "warped" image.

Standard convolution algorithms use floating point arithmetic or decimal variables as basic objects of computation. However, the numerous decimals provided by a floating point variable were discovered to be superfluous for processing of pixel images used in such applications as DFI analysis. The precision of a floating point representation is the number of digits after the decimal point. A precision of 3 digits was discovered to be adequate for the case of a 512×512 matrix of pixels having intensity values between 0 and 255. Accordingly, the relatively slow operations with the floating point variables was avoided by replacing them with integer or "short" variables. Fixed point arithmetic operations were used, with significant savings of processing time.

Fixed point arithmetic consists of splitting the bits of an integer into 2 parts. The lower bits are reserved to the decimal part of the variable. The higher bits are reserved to the mantissa of the variable. With a 32 bit integer, if each part has 16 bits, the emulated floating point variable z has the equivalent of a precision of 5 because the minimum variation is $$\delta z = \frac{1}{2^{16}} \approx 0.00001$$

Signed or unsigned variables may be used, and all the basic operations can be performed. Some operations become extremely fast: for instance, any multiplication or a division by a power of 2 is instantaneous. Indeed they are actually only single shift operations for the microprocessor, and take only few clock cycles.

Nevertheless, because multiplication with floating point representations is no longer an "internal" function of the microprocessor, caution is required.

To illustrate the use of fixed-point arithmetic as a substitute for floating point arithmetic, take as an example an integer, split into 2 equal parts. The representation of "1" is 1 shifted by 16 binary places, that is, by $2^{16}$, or 65,536. If the multiplication was an internal operation, $1 \times 1$ would be represented by $2^{16}$ and not $2^{16} \times 2^{16} = 2^{32}$.

The 2 parts of the result have to be computed separately. The cost of this cut and paste operation is 2 shifts for the mantissa, plus an add instruction to recompose the result. But because most of the multiplications involved in convolutions are external multiplication by an integer (pixel coordinates and intensity values are expressed as integers), such operations can be made directly, and are basic and fast operations. In a preferred implementation of the present invention, values shortened to 16 bits ("shorts") are used with 8 digit fixed point arithmetic. The pixels of an image are 8 bit data.

Taking equation (1) above as an example, the basic arithmetic operation to be performed can be written:

$$p = l \cdot \alpha + (1-l) \cdot \beta \quad (2)$$

where $\alpha, \beta \in N$ ($\alpha$ and $\beta$ are integer values) and $0 \leq l \leq 1$ There are one subtraction, two external multiplications by integer values and an addition that have to be performed in fixed point arithmetic representation. Since it is preferred to avoid using decimal representations, the invention contemplates replacing l by k, with $k = 256 \cdot l$ The final result is shifted by 8 (the equivalent of division by 256) to give the value of the resulting pixel.

For example, if
$l = 0.34$
$\alpha = 209, \beta = 198,$ and $k = 87$
$1 - l$ is represented by $256 - 87 = 169$
If p' is the fixed point representation of p, equation (2) becomes:

$$p' = k \cdot \alpha + (256 - k) \cdot \beta \quad (3)$$

and
$$p = p' >> 8 \quad (4)$$

where ">>" is the right shift of the microprocessor. Comparing the results,
(2) gives 201.74 and since $p \in N \rightarrow p = 201$
(3) gives $p' = 51645$
(4) gives $p = 51645 >> 8 = 201$ The present invention is preferably carried out in a series of steps, as follows:

(1) Two images are selected and displayed on display terminal 18, one from each of two stacks.

(2) Using the keyboard or pointer means (which may be a mouse or other suitable device), a cursor is moved to the location of any selected feature of the first image, a marker is placed at the location on the displayed image and the coordinate position of the feature is recorded, preferably in RAM 56. The cursor is moved to the location of any selected feature of the second image (preferably a feature which the operator considers to correspond to the selected feature of the first image), a marker is placed on that location of the displayed image and the coordinate position of this feature is recorded. The selection and recording process is then repeated for two additional features of each image. The amplitude of the warping operation (stretch + translation) is thereby set interactively by the user.

In the preferred form of the invention, computing system 50 includes a magnification feature which allows a portion of an image to be displayed in a window of selected magnification, such that individual pixels of the image may be discerned, and a capability for recording the position of a selected feature with sub-pixel precision. For example, the computing system preferably permits 4× magnification of a portion of the image and placement of the cursor and recording of the cursor position with a precision of ¼ to ½ pixel. An example of a magnified portion of an image is shown in the encircled region of the right-hand image of FIG. 3. Such magnification aids proper alignment of images in which features, such as the width of a line representing a metal conductor in the IC device, may be defined by as few as two pixels.

The magnification may be carried out by means of the alignment method of the present invention: the portion of the image to be magnified is treated as an image to be "warped". If the magnification is 4×, the mangified version will have 16 times as many pixels representing the same features as the selected portion of the original image. The value of each pixel in the magnified version is extrapolated from the values of the pixels surrounding the location of the original image which corresponds to the pixel of the magnified version.

(3) A geometric planar transformation in the form of a 3×3 matrix of floating point values is then calculated which maps the positions of the selected features of the first image into those of the second image.

For example, assume that the three markers on the first image have the coordinates b[i]·x and b[i]·y and the three markers on the second image have the coordinates a[i]·x and a[i]·y, with i having values between 1 and 3. Two 3×3 matrices "B" and "A" are constructed, with
B[i][0]=b[i]·x and A[i][0]=a[i]·x
B[i][1]=b[i]·y and A[i][1]=a[i]·y
B[i][2]=1.0 and A[i][2]=1.0

The unique matrix M for which A=M·B is the desired geometric transformation matrix. The values in the 2×2 sub-matrix M[i][j] (where i,j may each have the values 0, 1) are the factors correcting the rotation, tilt and magnification distortion of the images. The value of M[0][2] is the horizontal translation factor, and the value of M[1][2] is the vertical translation factor.

(4) The values in the transformation matrix M are then transformed into fixed point representations (FPRs). In accordance with the invention, an FPR is preferably an integer which is 255 times as large as the floating point variable. For instance: 0 becomes 0; 0.25 becomes 64; 0.5 becomes 127. An advantage of FPR transformation is that subsequent arithmetic operations to be performed will be integer operations which are many times faster to perform than floating point operations in a general-purpose processor such as microprocessor 54.

(5) The resultant image is then scanned line by line to transform positions of the first image into pixel positions of the resultant image, using the FPR values of the transformation matrix. In performing this transformation, and to minimize the time required to calculate pixel values of the resultant image, a test is performed to determine whether a given position of the first image, when mapped into the coordinates of the resultant image, will be within the desired display field of the resultant image. It will be recalled that the intention is to have a resultant image which matches pixel-for-pixel with the second image, which has a display field of 512 lines and 512 columns of pixels. If the transformed pixel location is outside the display field, it is assigned a fixed intensity value to produce, for example a black pixel when displayed.

Figure 8:
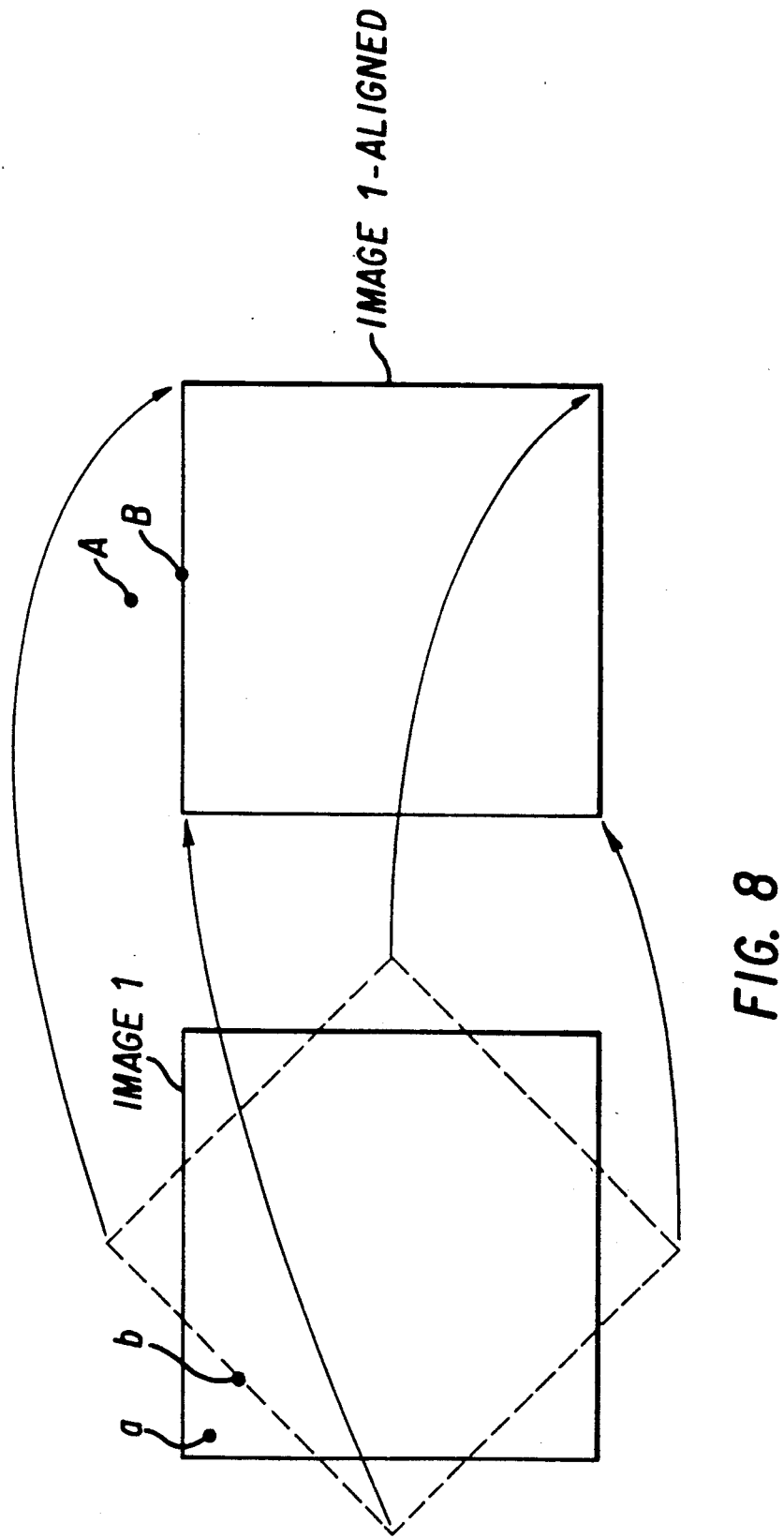
FIG. 8 illustrates schematically the testing of pixel locations to determine whether they are within the intended display frame of a resultant image.

More particularly, the resultant image (image1-aligned) is made up of pixels, each pixel having a value that is to be calculated from the pixel values of the first image (image1). A location L1 in image1 (for example, location 440 in FIG. 7) is transformed into a location L1a (location 330 in FIG. 6) in image1-aligned. The pixel at the location L1a in image1-aligned retains the value extrapolated for location L1 in image1. For each of the 512×512 locations L1a in image1-aligned a test is done to determine whether the corresponding position in image1 is within the display field of image1-aligned when transformed into the coordinate system of image1-aligned. In other words, neither of the horizontal and vertical coordinates of a pixel location L1a may be greater than 512 or smaller than 0. FIG. 8 schematically illustrates the principle: A location a of image 1 corresponds to a location A outside the display field of image1-aligned, while a location b of image 1 corresponds to a location within the display field of image1-aligned.

Normally, the position L1 is a decimal value. But because FPR values are used, the four tests (two for the horizontal border and two for the vertical border of the display field) may be performed with integer logical operations. The test is therefore many times faster than if done with floating point arithmetic. If the test diagnoses a pixel outside the frame of the display field, the result is set to black.

(6) Because the position L1 may be decimal (i.e., the coordinates of L1 may fall between pixels of the first image), it is necessary to extrapolate the pixel value from surrounding pixels. The extrapolation can be viewed as a weighted average of the four pixels surrounding position L1. If the distance between two pixels is 1 unit, the weight assigned to each pixel is 1 minus the fractional unit distance to the location.

Pre-calculated "look-up" tables are preferably used to minimize the time needed to perform the extrapolation. Use of such tables is made possible by the use of FPR: at this stage of the alignment process it is only necessary to deal with integers that may become element numbers of a pre-calculated array of values. Instead of computing each result individually, it may simply be selected from an indexed static table of values. Such a table is preferably calculated automatically upon startup of the computing system 50, and may be stored in the active memory of RAM 56 or in "swap space" in data storage device 58. For the example given below, the table contains 2×65536 values, requiring about 128K bytes of storage space.

A preferred manner of extrapolating pixel values utilizing look-up tables will now be described. A location of interest, L1, is surrounded by pixels, pixels p1 and p2 above, and p3 and p4 below. The values of these four pixels are compressed to 4 bits. Fixed point representations of $\delta x$ and $\delta y$ values ($\delta x$ and $\delta y$ are decimal values between 0 and 1, as described above).

Averaging is then performed in three steps: The average of p1 and p2 is calculated, the average of p3 and p4 is calculated, and the two averages are added.

The first averaging makes use of the lookup table, which has 16 bit entries (representing four bits each for pixel intensity values p1 and p2, and four bits each for position values $\delta x$ and $\delta y$). The contribution of the two upper pixels is read in the lookup table. The index used to select the value from the lookup table is prepared by calculating decimal values between 0 and 1 for $\delta x$ and $\delta y$ (from the position coordinates of the location of interest L1 and the surrounding pixels), calculating a FPR for $\delta x$ and $\delta y$, extracting pixel intensity values p1 and p2 and putting the four values in a single short (which is 16 bits for the UNIX-based computing system of a Schlumberger "IDS 5000" test system).

The second averaging uses the same lookup table. An index which is made of p3, p4, $\delta x$ and $\delta y$ points in the table to a value that is the contribution of the lower pixels.

The value of the resulting pixel (a value between 0 and 255) is the sum of the two contributions.

With a Schlumberger "IDS 5000" system, the computing system 50 is capable of aligning two 512×512 pixel images with pixel intensity values of 0 to 255 in less than two seconds, if the properly indexed lookup table is pre-calculated.

Such a lookup table can be prepared as follows, where δx and δy define the barycentric position of the location L1, and P₁ and P₂ are either the two upper or the two lower pixels. If PiU and PiL are the upper and lower pixels the transformation is P=(1−δy)*((1−δx)*P1U+δx*P2U)+-δy*((1−δx)*P1L+δx*P2L).

For example, if δx=0.25, δy=0.8, p1=40, p2=200, p3=60 and p4=220, the four bits representing δx would be 8 (in decimal), the four bits representing δy would be 12, the four bits representing p1 would be 2, the four bits representing p2 would be 12, the four bits representing p3 would be 3, and the four bits representing p4 would be 13. The index value for the first lookup is thus 3 8 12 12, and the corresponding value from the lookup table is 42, representing the contributions of p1 and p2 to the resultant pixel. The index value for the second lookup is thus 3 8 13 12, and the corresponding value from the lookup table is 54, representing the contributions of p3 and p4. The sum of these values, 96, is the value of the resultant pixel. In the preferred form of the invention embodied in the Appendix below, only 32 gray levels (pixel intensity values) are used, which has been found adequate for acceptable image display quality; these 32 levels are represented by values ranging from 33 to 64. Other such modifications are possible within the spirit and scope of the present invention.

The resultant image (a version of a first image "warped" into alignment with a second image) may be compared with the second image by subtracting intensity values, pixel-by-pixel. The intensity of each pixel is represented by 8 bits and thus has a value between 0 and 255. When the images are subtracted, the difference values are between −255 and +255. Since the difference image must still be a pixel value, the −255 to 255 range must be mapped into the regular 0 to 255 gray range level. The difference image consists of information which falls into three ranges of intensity or bands of interest. The first band (from 0 to a level L1) corresponds to features that are in the second image but not in the first image. The second band (from L1 to a level L2) corresponds to features that are the same in both images. The third band (from L2 to 255) corresponds to features that are in the first image but not in the second image.

Figure 9:
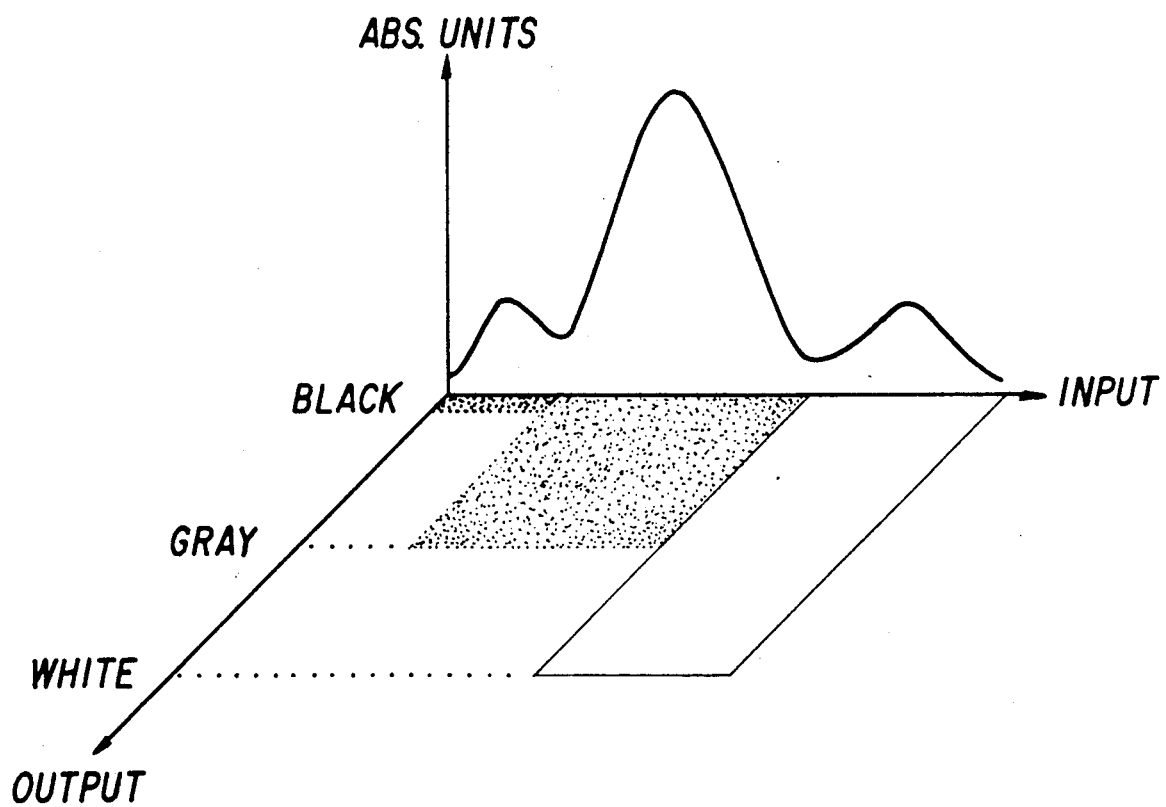
FIG. 9 illustrates the principle of three-level thresholding to enhance visibility of differences between images.

To detect these bands, a 3 level threshold filter is used, as illustrated in FIG. 9. Thus, the histogram which has initially 8 bit deep gray levels (256 different grays) is mapped into a black (0 to L1), gray (L1 to L2) and white (L2 to 255) three level scale.

Those of skill in the art will recognize that some particularities of the topography of the integrated circuit device may be enhanced. For example, a false coloring mode may be employed: instead of using images with gray levels, bright colors (i.e.: blue, yellow and red) may displayed.

It will also be recognized that the levels may be set interactively on a selected image of the stack ("the star image"), to optimize the information, and applied to all or any desired set of images of the stack. Differences in contrast and brightness between the images of one stack (e.g., "golden device" images) and the images of the other stack (e.g., "test device" images) are addressed by just changing the threshold values.

APPENDIX

Copyright © 1988 Schlumberger Technologies Inc.

```
/*********************************************************************

* Calculate lookup table (LUT) for the bilinear transformation : dx and

* dy give the barycentric position of the pixel.

* p1 and p2 are either the 2 upper or the 2 lower pixels

*

* if PiU and PiL are the upper and lower pixels the transformation is P =

* (1-dy)*((1-dx)*P1U + dx*P2U) + dy*((1-dx)*P1L + dx*P2L)

*********************************************************************/ static unsigned short *convol4_cvt;
```

```
#define mul(p1,dx,p2,dy)     cv[65536 + 4096*(p1) + 256*(dx) + 16*(p2) + (dy)]
#define one_mul(p1,dx,p2,dy) cv[4096*(p1) + 256*(dx) + 16*(p2) + (dy)]

unsigned short *makecvt_convol4()
{
register int     i1, i2, ix, iy;
register unsigned short tmp, tmp1;
register unsigned short *cv;
int              size = SIZE;
    if (convol4_cvt) return;
    cv = convol4_cvt = (unsigned short *) calloc(sizeof(unsigned short), (256 * 256 * 2) +SIZE + SIZE );
    if (!convol4_cvt){
        parser_error_mess(ALLOC_ERR,NO_TEXT);
        return;
    }
    for (i1 = 16; --i1 != -1;) {
        for (ix = 16; --ix != -1;) {
            for (i2 = 16; --i2 != -1;) {
                for (iy = 16; --iy != -1;) {
                    tmp = (((16 - ix) * i1) + (ix * i2));
                    tmp1 = ((tmp * iy) >> 7);
                    mul(i1, ix, i2, iy) = tmp1;
                    tmp1 = ((tmp * (16 - iy)) >> 7);
/*we add 33: the range of final result will be 33 to (0xf0 >>3)+33=63*/
                    one_mul(i1, ix, i2, iy) = tmp1 + 33;
                }
            }
        }
    }
} extern int matrix();
```

```
extern float m[3][3];

unsigned char *align4(pts)
struct points pts[2][3];
{
register unsigned char *id;
register unsigned char *od;
register unsigned short *cv = convol4_cvt;
register int      *y;
unsigned char    *odata = (MemPixData != r1 ? r1 : r2);
int              j;

register int     dx;
register int     i;
register int     x;
register int     dy;
register int     tmp1,tmp2;

register float   multiplier;
int              fp0,fp1,fpx,fpy;
int              fp00,fp01,fp10,fp11;

/*******************************************
 * calculate the position transformation
 *******************************************/ if (matrix(pts[1][0].x,pts[1][0].y,pts[1][1].x,pts[1][1].y,pts[1][2].x,pts[1][2].y,
          pts[0][0].x,pts[0][0].y,pts[0][1].x,pts[0][1].y,pts[0][2].x,pts[0][2].y))
         return (0);

od = odata ;
    if (!odata || !cv) return (0);
    id = MemPixData;
```

```
/***********************************************************************
***
* transform the values of the matrix into their fixed point representation

***********************************************************************
***/

/* fixed point representation of 1 */
    multiplier = (float) (1 << SHIFT);
      /* fixed point representation of the matrix values */
    fp00 = (int) (multiplier * m[0][0]);
    fp01 = (int) (multiplier * m[0][1]);
    fp10 = (int) (multiplier * m[1][0]);
    fp11 = (int) (multiplier * m[1][1]);
      /* fixed point representation of the x increment at a line end */
    fp0 = 512 * (int) fp00-fp01;
      /* fixed point representation of the y increment at a line end */
    fp1 = 512 * (int) fp10-fp11;
      /* fixed point representation of the translation */
    fpx = multiplier * (int) m[0][2];
    fpy = multiplier * (int) m[1][2];

/***********************************************************************
* start at the top left point that is not outside the result image
***********************************************************************/

/* initialisation */
    x = fpx;
    y = (int *) fpy;

for (j = 0; j < 512; j++) {
       i = 512;
       for (; --i != -1;) {
```

```
/*******************************************
 * test whether x or y is not outside the frame
 * (0,511): tricky, but 4 tests at once
 *******************************************/ dx = x;
dy = (int) y;
tmp1 = dx | dy;

/**********************************
 * outside -> give a BLACK pixel *
 **********************************/ if (tmp1 & 0xfffe0000) {
*od++ = DFI_BLACK;
x += fp00;
y = (int *) ((int) y+fp10);
} else {
/*******************
 * inside the frame
 *******************/

/* (x,y) position in non fx pt rep */
tmp2 = dy;
tmp2 >>= SHIFT;
tmp2 *= 512;
tmp1 = dx;
tmp1 >>= SHIFT;
tmp1 += tmp2;

/*************************************
 * Read to pixels at the same time
 *************************************/ tmp2 = (int) *(unsigned short *) (id+tmp1);
```

/* match the value with the colormap (32 to 64) */ tmp2 <<= 3;

tmp2 &= 0xf0f0;

/*
 * set the value to be passed into the LUT it
 * is p1-dx-p2-dy with tmp2 = p1-nil-p2-nil
 */ dy &= MASK;

dy >>= 4;

dx &= MASK;

dx <<= 4;

dx += dy;

tmp2 += dx;

/******************************************************
 * upper pixel operation (first Look up table use)
 ******************************************************/ tmp2 = cv[tmp2];

tmp1 += 512;

/*************************************
 * Read to pixels at the same time
 *************************************/

/* gets the 2 lower pixels */ tmp1 = (unsigned int) *(unsigned short *) (id+tmp1);

/* match the value with the colormap (32 to 64) */ tmp1 <<= 3;

tmp1 &= 0xf0f0;

```
/*******************************************************
 * lower pixel operation (second Look up table use)

*******************************************************/ tmp1 += dx;

tmp2 += cv[tmp1+65536];

*od++ = (unsigned char) tmp2;

x += fp00;

y = (int *) ((int) y+fp10);

}

} x -= fp0;

y = (int *) ((int) y-fp1);

}

/**************
 * result image
 **************/ return (odata);

}
```

We claim:

1. A method of preparing from a first image a resultant image which is aligned pixel-for-pixel with a second image, each said image comprising a set of machine-displayable pixels and having visible features defined by said pixels when displayed, each pixel defined by a display coordinate position and an intensity value, comprising the steps of:

a. i. recording coordinate positions of at least three selected features of said first image,
   ii. recording coordinate positions of at least three selected features of said second image with which said at least three selected features of said first image are to be aligned in a resultant image, and
   iii. calculating from said recorded coordinate positions a matrix of floating point values from which coordinate positions of said first image can be mapped into respective coordinate positions of said resultant image;

b. transforming said matrix of floating point values into respective fixed point representations;

c. using said fixed point representations to calculate with fixed point arithmetic, for each display coordinate position of said resultant image, a corresponding coordinate position of said first image; and d. extrapolating a resultant image pixel intensity value for each display coordinate position of said resultant image, from intensity values of pixels surrounding said corresponding coordinate position of said first image, thereby producing a set of pixels defining said resultant image;

whereby said resultant image comprises a version of said first image having features aligned with features of said second image, the pixels of said resultant image being aligned with respective display coordinate positions of pixels of said second image.

2. The method of claim 1, wherein said first and second images are stroboscopic voltage contrast images produced by an electron-beam test system and are representative of integrated circuit operating states.

3. The method of claim 1, wherein step a. further comprises the step of displaying said first and second images on a display screen.

4. The method of claim 1, wherein said values representative of said selected features are recorded with sub-pixel precision.

5. The method of claim 1, wherein said matrix comprises a 2×2 matrix of values representing factors for correction of rotation, tilt and magnification distortion between said first and second images.

6. The method of claim 1, wherein step b. includes storing said fixed point representations in a register, and wherein step c. comprises calculating said corresponding coordinate positions of said first image in a microprocessor device.

7. The method of claim 1, wherein step d. comprises the steps of:
   i. calculating floating point values representing distances between said corresponding coordinate position and said pixels surrounding said corresponding coordinate position.
   ii. converting said floating point values representing distances into fixed point values representing distances, and
   iii. calculating said resultant image pixel intensity value from said fixed point values representing distances and from said intensity values of pixels surrounding said corresponding coordinate position in a processor employing fixed point arithmetic, such that said resultant pixel intensity value comprises an average of intensity values of said pixels surrounding said corresponding coordinate position, said average being weighted by said fixed point values representing distances.

8. The method of claim 1, further comprising the steps of calculating a table of fixed-point values, each value of said table representing a weighted contribution of one of said pixels surrounding said corresponding coordinate position to said resultant image pixel intensity value, and storing said table of values, wherein step d. further comprises the step of retrieving a value from said table for each of said pixels surrounding said corresponding coordinate position and combining said retrieved values to form said resultant image pixel intensity value.

9. The method of claim 8, wherein each stored value of said table is associated with a stored index value, and wherein said step of retrieving a value from said table comprises the steps of (i.) calculating a calculated index value from the intensity value of at least one of said pixels surrounding said corresponding coordinate position and from respective distances between said at least one of said pixels surrounding said corresponding coordinate position and said corresponding coordinate position, and (ii.) matching said calculated index value with said stored index value to select a stored value to be retrieved from said table.

10. Apparatus for preparing from a first image a resultant image which is aligned pixel-for-pixel with a second image, each said image comprising a set of pixels capable of being displayed on a visual display terminal and having visible features defined by said pixels when displayed, each pixel defined by a display coordinate position and an intensity value, comprising:
   I. recording means for:
      a. recording coordinate positions of at least three selected features of said first image, and
      b. recording coordinate positions of at least three selected features of said second image with which said at least three selected features of said first image are to be aligned in a resultant image; and
   II. computing means for:
      a. calculating from said coordinate positions recorded in said recording means a matrix of floating point values from which coordinate positions of said first image can be mapped into respective coordinate positions of said resultant image;
      b. transforming said matrix of floating point values into respective fixed point representations;
      c. using said fixed point representations to calculate with fixed point arithmetic, for each display coordinate position of said resultant image, a corresponding coordinate position of said first image; and
      d. extrapolating a resultant image pixel intensity value for each display coordinate position of said resultant image, from intensity values of pixels surrounding said corresponding coordinate position of said first image, thereby producing a set of pixels defining said resultant image;

whereby said set of pixels defining said resultant image comprises a version of said first image having features aligned with features of said second image, the pixels of said resultant image being aligned with respective display coordinate positions of pixels of said second image.

11. The apparatus of claim 10, further comprising electron-beam probe means for acquiring said first and second images as stroboscopic voltage contrast images representative of integrated circuit operating states.

12. The apparatus of claim 10, further comprising means for is displaying said first and second images on a display screen.

13. The apparatus of claim 10, wherein said recording means is capable of recording values representative of said selected features with sub-pixel precision.

14. The apparatus of claim 10, wherein said matrix comprises a 2×2 matrix of values representing factors for correcting of rotation, tilt and magnification distortion between said first and second images.

15. The apparatus of claim 10, further including means for storing said fixed point representations.

16. The apparatus of claim 10, wherein said computing means comprises means for (i) calculating floating point values representing distances between said corresponding coordinate position and said pixels surrounding said corresponding coordinate position, (ii) converting said floating point values representing distances into fixed point values representing distances, and (iii) calculating said resultant image pixel intensity value from said fixed point values representing distances and from said intensity values of pixels surrounding said corresponding coordinate position, employing fixed point arithmetic, such that said resultant image pixel intensity value comprises an average of the intensity values of said pixels surrounding said corresponding coordinate position, said average being weighted by said fixed point values representing distances.

17. The apparatus of claim 10, further comprising table means for calculating a table of fixed-point values, each value of said table representing a weighted contribution of one of said pixels surrounding said corresponding coordinate position to said resultant image pixel intensity value, and storing said table of values, and wherein said computing means comprises means for retrieving a value from said table for each of said pixels surrounding said corresponding coordinate position and means for combining said retrieved values to form an extrapolated resultant image pixel intensity value.

18. The apparatus of claim 17, wherein each stored value of said table is associated with a stored index value, and wherein said computing means comprises means for retrieving a value from said table, calculating a calculated index value from the intensity value of at least one of said pixels surrounding said corresponding coordinate position and from respective distances between said at least one of said pixels surrounding said corresponding coordinate position to said corresponding coordinate position, and matching said calculated index value with said stored index value to select a stored value to be retrieved from said table.

19. A method of preparing from a first image a resultant image which is aligned pixel-for-pixel with a second image, each said image comprising a set of machine-displayable pixels and having visible features defined by said pixels when displayed, each pixel defined by a display coordinate position and an intensity value, comprising the steps of:
 a. calculating a matrix of floating point values from which coordinate positions of said first image can be mapped into respective coordinate positions of said resultant image;
 b. transforming said matrix of floating point values into respective fixed point representations;
 c. using said fixed point representations to calculate with fixed point arithmetic, for each display coordinate position of said resultant image, a corresponding coordinate position of said first image; and
 d. extrapolating a resultant image intensity value for each display coordinate position of said resultant image to produce a set of pixels defining said resultant image, said step of extrapolating comprising the steps of, for each said display coordinate position of said resultant image:
   i. calculating floating point values representing distances from said corresponding coordinate position to pixels of said first image surrounding said corresponding coordinate position,
   ii. converting said floating point values into fixed point values, and
   iii. calculating said resultant image pixel value from said fixed point values and from intensity values of pixels of said first image surrounding said corresponding coordinate position such that said resultant image pixel value comprises an average of intensity values of pixels of said first image surrounding said corresponding coordinate position, said average being weighted by said distance values;
whereby said resultant image comprises a version of said first image having features aligned with features of said second image, and having pixels aligned with respective display coordinate positions of pixels of said second image.

20. A method of preparing from a first image a resultant image which is aligned pixel-for-pixel with a second image, each said image comprising a set of machine-displayable pixels and having visible features defined by said pixels when displayed, each pixel defined by a display coordinate position and an intensity value, comprising the steps of:
 a. calculating a matrix of floating point values from which coordinate positions of said first image can be mapped into respective coordinate positions of said resultant image;
 b. transforming said matrix of floating point values into respective fixed point representations;
 c. using said fixed point representations to calculate with fixed point arithmetic, for each display coordinate position of said resultant image, a corresponding coordinate position of said first image;
 d. extrapolating a resultant image pixel intensity value for each display coordinate position of said resultant image, from intensity values of pixels surrounding said corresponding coordinate position of said first image, to produce a set of pixels defining said resultant image, said step of extrapolating comprising the steps of, for each said display coordinate position of said resultant image:
   i. retrieving a first value from pre-calculated table of fixed-point values, said first value representing a weighted contribution of the values of a first pair of surrounding pixels to said resultant pixel intensity value,
   ii. retrieving a second value from a pre-calculated table of fixed-point values, said second value representing a weighted contribution of the values of a second pair of surrounding pixels to said resultant pixel intensity value, and
   iii. combining said first value and said second value to form said resultant pixel intensity value;
whereby said resultant image comprises a version of said first image having features aligned with features of said second image and having pixels aligned with respective display coordinate positions of pixels of said second image.

21. The method of claim 20, wherein each value of said pre-calculated table is associated with a stored index value, and wherein retrieving a value from said table comprises the steps of calculating a calculated index value from the value of at least one said surrounding pixel and from the distances of said at least one surrounding pixel to said corresponding coordinate position, and matching said calculated index value with said stored index value to select a value to be retrieved from said table.

22. Apparatus for preparing from a first image a resultant image which is aligned pixel-for pixel with a second image, each said image comprising a set of pixels capable of being displayed on a visual display terminal and having visible features defined by said pixels when displayed, each pixel defined by a display coordinate position and an intensity value, comprising:
 a. means for calculating a matrix of floating point values from which coordinate positions of said first image can be maped into respective coordinate positions of said resultant image;
 b. means for transforming said matrix of floating point values into respective fixed point representations;
 c. means for using said fixed point representations to calculate with fixed point arithmetic, for each display coordinate position of said resultant image, a corresponding coordinate position of said first image; and
 d. means for extrapolating a resultant image pixel intensity value for each display coordinate position of said resultant image, from intensity values of pixels surrounding said corresponding coordinate position of said first image, to produce a set of pixels defining said resultant image, said extrapolating means comprising means for:

i. calculating floating point values representing distances from said corresponding coordinate position to said pixels surrounding said corresponding coordinate position, ii. converting said values representing distances into fixed point values, and iii. calculating said resultant image pixel intensity value from said fixed point values and from intensity values of pixels surrounding said corresponding coordinate position in a processor employing fixed point arithmetic such that said resultant image pixel value comprises an average of said surrounding pixel intensity values, said average being weighted by said distance values.

whereby said set of pixels defining said resultant image comprises a version of said first image having features aligned with features of said second image and having pixels aligned with respective display coordinate positions of pixels of said second image.

23. Apparatus for preparing from a first image a resultant image which is aligned pixel-for pixel with a second image, each said image comprising a set of pixels capable of being displayed on a visual display terminal and having visible features defined by said pixels when displayed, each pixel defined by a display coordinate position and an intensity value, comprising:

a. means for calculating a matrix of floating point values from which coordinate positions of said first image can be mapped into respective coordinate positions of said resultant image;

b. means for transforming said matrix of floating point values into respective fixed point representations;

c. means for using said fixed point representations to calculate with fixed point arithmetic, for each display coordinate position of said resultant image, a corresponding coordinate position of said first image; and d. means for extrapolating a resultant image pixel intensity value for each display coordinate position of said resultant image, from intensity values of pixels surrounding said corresponding coordinate position of said first image, to produce a set of pixels defining said resultant image, said extrapolating means comprising means for:

i. retrieving a first value from a pre-calculated table of fixed-point values, said first value representing a weighted contribution of the values of a first pair of surrounding pixels to said resultant pixel intensity value, ii. retrieving a second value from a pre-calculated table of fixed-point values, said second value representing a weighted contribution of the values of a second pair of surrounding pixels to said resultant pixel intensity value, and iii. combining said first value and said second value to form said resultant pixel intensity value;

whereby said set of pixels defining said resultant image comprises a version of said first image having features aligned with features of said second image and having pixels aligned with respective display coordinate positions of pixels of said second image.

24. The apparatus of claim 23, wherein each stored value of said table is associated with a stored index value, and wherein said extrapolating means comprises means for calculating a calculated index value from the value of at least one said surrounding pixel and from the distances of said at least one surrounding pixel to said corresponding coordinate position, and matching said calculated index value with said stored index value to select a value to be retrieved from said table.

* * * * *